United States Patent Office 3,023,209
Patented Feb. 27, 1962

3,023,209
THIOLTHIONOPHOSPHORIC ESTERS AND
THEIR PRODUCTION
Johannes Reese, Wiesbaden-Biebrich, and Berthold Brähler, Wiesbaden, Germany, assignors to Chemische Werke Albert, Wiesbaden-Biebrich, Germany, a corporation of Germany
No Drawing. Filed Mar. 4, 1958, Ser. No. 718,967
Claims priority, application Germany Mar. 8, 1957
26 Claims. (Cl. 260—250)

This invention relates to thiolthionophosphoric esters and their production.

The production of the addition products of dithiophosphoric acid-O,O-diesters and compounds having strong polar double bonds, such as acrylonitrile or styrene, is known. These reactions take place at a satisfactory rate at low temperatures but considerable quantities of undesirable by-products are frequently formed which is partly due to the polymerization of the olefinic component. The production of such by-products is difficult to avoid even when adding inhibitors. On the other hand, unsaturated compounds which are equally or similarly substituted electro-negatively on both sides of the double bond, such as maleic acid diester or fumaric acid monoester, have a much lesser tendency towards polymerization, but they form the additive compounds, or adducts, with the dithiophosphoric acid-O,O-diester comparatively slowly and at a satisfactory rate only in the presence of a catalyst. Even when catalysts are used, medium temperatures and relatively long reaction periods are required. The formation of additive compounds of dithiophosphoric acid-O,O-diesters and olefin hydrocarbons having no, or only weak, polar double bonds requires the use of higher temperatures as well as the presence of catalysts. At times, extremely long reaction periods are required, and, as a result, isomerization of the raw material as well as the final product are unavoidable.

It has now been surprisingly found that neutral esters of thiolthionophosphoric acid are very readily obtained by reacting dithiophosphoric acid-O,O-diesters with compounds of the type which contains a bicyclo seven membered ring system with an unsaturated carbon-to-carbon bond which may be referred to generically as bicyclo-(1,2,2)-heptenes. The bicyclo-(1,2,2)-heptene and its derivatives must be considered non-polar. Yet these compounds enter readily into the reactions of this invention to form addition products, or adducts. The great readiness with which the bicyclo-(1,2,2)-heptenes enter, more or less smoothly, into the addition reactions of this invention may be attributable to the fact that the double bond is present in a ring system under strain.

In almost all instances dithiophosphoric acid-O,O-diesters readily form adducts with compounds of the type of bicyclo-(1,2,2)-heptenes. Customarily, the reaction is achieved by intimately mixing molar quantities of the reactants, but a slight molar excess of the dithiophosphoric acid diester is at times advantageously used. For more complex compounds containing two or more bicycloheptene radicals, a mol of the dithiophosphoric acid diester is customarily used for each heptene radical. For the most part, the addition takes place, at room temperature and is accompanied by strong exothermic heat of reaction. In some instances, the reaction takes place within a period of a few minutes. Generally speaking, in the reaction, catalysts, such as tertiary aliphatic amines, and polymerization inhibitors are unnecessary. The conversion can be carried out in the presence or absence of inert organic solvents such as, for instance, low molecular aliphatic monovalent alcohols; ketones, for instance, acetone, cyclohexanone, acetophenone, and the like; aromatic hydrocarbons, such as benzene, toluene, xylene, as well as nitrobenzene and chlorobenzene; additionally chloroform, carbon tetrachloride; tetrahydrofurane; and dioxane and other higher boiling ethers.

Thus, the reaction may take place by the instantaneous fusion of the components or by the more or less rapid addition of one component to the other in a homogeneous or heterogeneous phase. The new esters are obtained partly as crystalline products and partly as weakly colored oils. However, they are always obtained with a good yield and in high purity.

The dithiophosphoric acid-O,O-diesters used as reactants in this invention are readily available commercially and may be considered to have the formula

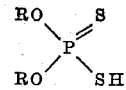

where R is the esterifying radical. Due to the fact that substantially neutral compounds in good yields having very good insecticidal, fungicidal, and akaracidal (miticidal) properties and, as well, compounds having valuable properties making them useful as corrosion inhibitors, plasticizing agents, lubricating oil additives, and flotation agents can be made from dithiophosphoric acid-O,O-dialkyl esters, and for economic reasons, these types of dithiophosphoric acid diesters reactants are preferred. In other words, in the formula R is preferably an alkyl radical, either higher molecular or lower molecular, as derived, for example, from lower and higher molecular weight alkanols. By lower alkanols is meant octanol and lower alcohols, and by higher molecular weight alkanols is meant alcohols such as nonyl, decyl, dodecyl, tridecyl, myristyl, cetyl, stearyl alcohol, etc., etc. It will be understood, however, that adducts can be formed with the bicyclo-(1,2,2)-heptenes when other known esters are used in which R may be substituted or unsubstituted cycloalkyl, aryl, aralkyl, alkaryl, instead of an alkyl radical or a substituted alkyl radical.

The bicyclo-(1,2,2)-heptenes reactants of this invention are obtained by the diene synthesis which takes place readily and almost quantitatively. The variety of potential reactions in the diene type of reaction makes possible a wide variation in the characteristics of the final products. More specifically, the bicyclo-(1,2,2)-heptenes are derived by the Diels-Alder addition of cyclopentadiene and dienophile compounds. Dienophile compounds capable of forming adducts with cyclopentadiene are generally known to the organic chemists and are discussed in various standard text books, such as, in "Organic Chemistry," by Paul Karrer (fourth English edition, 1950), and published by Elsevier Publishing Company, or in Gilman's four volume text on "Organic Chemistry," published by John Wiley and Sons, Inc. For example, bicyclo-(1,2,2)-heptenes of this invention may be considered to be additive compounds, or adducts, of cyclopentadiene, and such compounds as the following:

(1) Diester of unsaturated aliphatic dicarboxylic acids, such as the dialkyl esters of maleic and like acids are used.

(2) Maleic acid anhydride and the like.

(3) Compounds of the type having the formula $CH_2=CH.R$ in which R represents the CHO—, COOR—, $CH_2OH$—, $CH_2Cl$—, $CH_2OOR$— or CN— group. Representative compounds having this formula are, for instance, acrolein, alkyl esters of methacrylic acid, allyl alcohol, allyl chloride, esters of allyl alcohol, acrylic acid nitrile, etc.

(4) Crotonic acid alkyl esters and like compounds.

(5) Ethylene substituted by negative radicals or groups such as ethylene substituted in the alpha and beta positions with halogens, α-nitro-β-trichlormethyl ethylene, etc.

(6) Quinone and its derivatives such as benzoquinone.

(7) Substituted and unsubstituted cyclopentadienes.

(8) Azodicarboxylic diesters, and especially the dialkyl esters, and like compounds.

(9) Adducts obtained from bicyclo-(2,2,1)-2,5-heptadiene and substituted and unsubstituted cyclopentadiene such as hexachlorcyclopentadiene and like compounds. bicyclo-(2,2,1)-2,5 heptadiene in turn, is derived from cyclopentadiene and acetylene.

Thus the bicycloheptenes of this invention may be considered to have the formula:

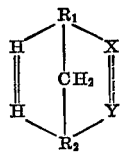

In the formula, X and Y represent carbon or nitrogen which can be further substituted by monovalent or divalent substituents such as hydrogen, alkyl, aryl, hydroxyl, carboxyl, alkoxyl, carboxylalkyl, acyl, acyloxyl, halogen, the nitro- cyanide-, or aldehyde groups as well as the oxo groups and, at times an alkylene or alkylidene group which may be further substituted and/or contain further unsaturated groups. $R_1$ represents a monovalent residue.

Hence the additive compounds may be considered to be formed in accordance with the following schematic equation.

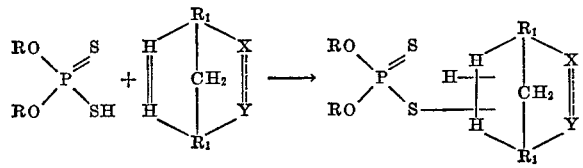

The following examples, which are purely illustrative, will serve to facilitate an understanding of the invention and will demonstrate the manner in which additive compounds can be produced which possess good insecticidal, fungicidal and miticidal properties, and, as well, additive compounds having properties rendering them useful as corrosion inhibitors, plasticizing agents, lubricating oil additives and flotation agents, etc. While, by analogy, it would seem that the characteristics of the new products of this invention are imparted predominately by the dithiophosphoric acid diesters, it nevertheless is true that the bicycloheptene component serves a very useful function. Among other things, the bicycloheptene reactant enables one to produce in a very facile manner substantially neutral esters and serves as a carrier for the di-thiophosphoric acid-O,O-diesters, while simultaneously imparting balanced and enhanced characteristics to the resultant additive compounds.

*Example 1*

A mixture is formed containing 21 g. (0.1 mol) of the dimethyl ester of cis- endomethylene-Δ⁴-tetrahydrophthalic acid and 15.8 g. (0.1 mol) of dithiophosphoric acid-O,O-dimethyl ester. The exothermic reaction takes place immediately upon forming the mixture and is tempered by strong cooling. After about 20 minutes, crystal precipitation from the colorless solution begins. In a few additional minutes, the deposited material solidifies into a crystalline form. Upon recrystallization from 100 cc. of a mixture of benzene and petroleum ether, 28.8 g. (78.7% of the theoretical yield) of a pure white substance is obtained having a melting point of 88–89° C.

The reaction is considered to take place in conformity with the following schematic representation.

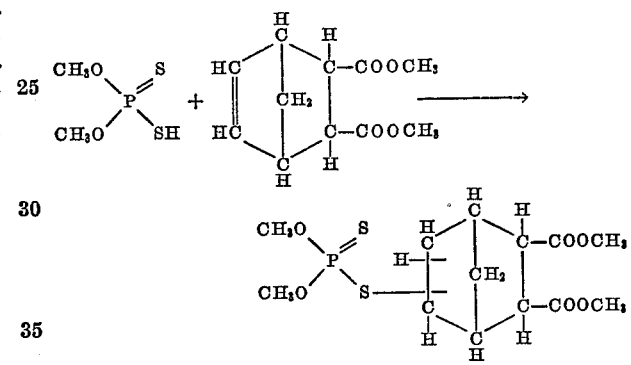

*Example 2*

A mixture is formed of 18.9 g. (0.12 mol) of dithiophosphoric acid-O,O-dimethylester and 0.1 g. of hydroquinone. Then, over a period of about 10 minutes 29.4 g. (0.1 mol) of cis-3,6-endomethylene-Δ⁴-tetrahydrophthalic acid butyl ester are dripped into the mixture. At the beginning the reaction is very exothermic and cooling is used, but the reaction slows up when the temperature falls below 60° C. After this 60° C. temperature is reached, the reaction mass is heated for an additional 6 hours at 60–65° C. The resulting reaction product is taken up in 200 cc. of benzene and 50 cc. of petroleum ether. After shaking out twice with 100 cc. of a 10% solution of soda, and washing six times with 150 cc. of water, the reaction product is dried and the solvent expelled. An orange colored clear oil is recovered in a yield of 38.6 grams which is 85% of the theoretical yield.

The reaction is considered to take place in conformity with the following schematic representation.

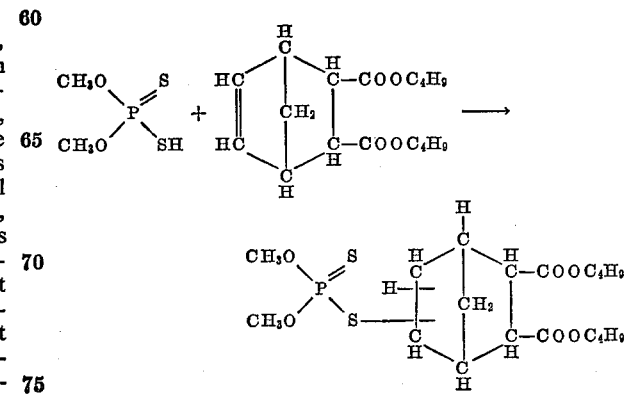

Example 3

After dissolving 14.6 g. (0.1 mol) of cis-endomethylene-Δ⁴-tetrahydrophthalic anhydride in 75 cc. of benzene, 18.9 g. (0.12 mol) of dithiophosphoric acid-O,O-dimethylester are stirred into the solution. After heating for 8 hours to 50° C., fine white crystals precipitate upon cooling the solution and are separated out and dried. In this way, 14.6 g. of the diester is recovered with a melting point of 105–106° C. After the mother liquor has excess dithiophosphoric acid-O,O-dimethylester removed therefrom, there remains, after removal of the solvent, 16.6 g. of a yellow syrup which solidifies into crystals after standing over night. After recrystallizing from a small amount of benzene this crystalline product also has a melting point of 105–106° C.

The reaction is considered to take place in conformity with the following schematic representation.

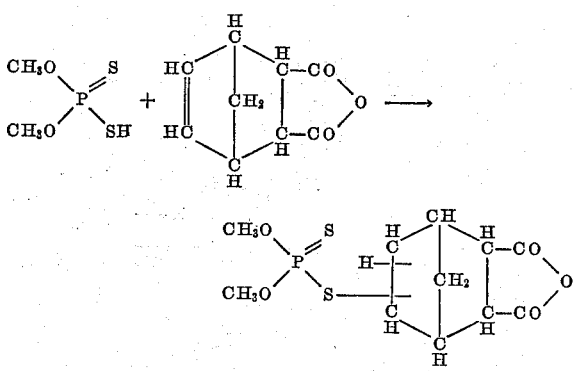

The reaction product is very useful as fungicide against alternaria tenuis.

Example 4

A mixture of 51.8 g. (0.1 mol) of cis-endomethylene-Δ⁴-tetrahydrophthalic acid dilauryl ester and 29.04 g. (0.12 mol) of dithiophosphoric acid-O,O-dibutylester is, after standing for one day at room temperature, dissolved in 150 cc. of benzene, shaken out with 50 cc. of a 10% sodium bicarbonate solution and, as well, twice with 100 cc. of water. Then the organic phase is dried and freed of solvent. In this manner, 59 g. (77.7% of the theory) of the new ester is obtained as an almost odorless oil.

The reaction is considered to take place in conformity with the following schematic representation.

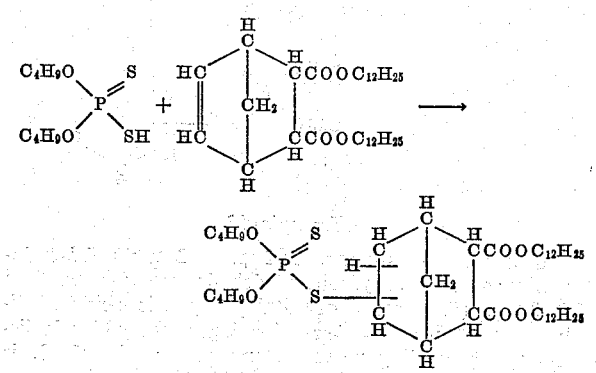

The newly found product is especially useful as addition for lubricating oils.

Example 5

While stirring and within 15 minutes, 21 g. (0.1 mol) of cis-3,6-endomethylene-Δ⁴-tetrahydrophthalic acid dimethyl ester are fed into 24.04 g. (0.12 mol) of dithiophosphoric acid-O,O-dibutyl ester. The strong exothermic heat of reaction is kept under 60° C. by cooling. After standing for one day, the reaction product is dissolved in 200 cc. of benzol, shaken out twice with each 100 cc. of a 10% soda solution and five times with 200 cc. of water. After drying and removal of the solvent there remains 39.5 g. (87.3% of the theory) of the new ester.

The reaction is considered to take place in conformity with the following schematic representation.

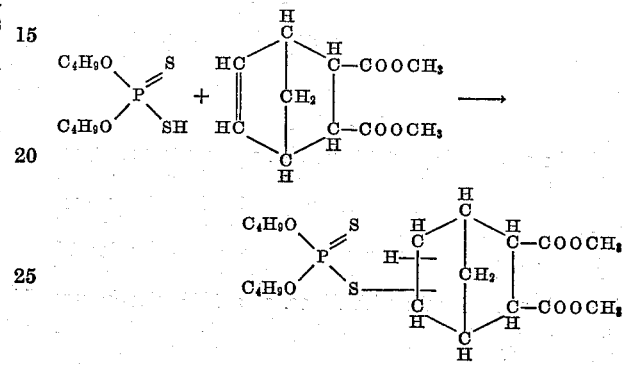

Example 6

In 10 minutes while stirring, 29.04 g. (0.12 mol) of dithiophosphoric acid-O,O-dibutyl ester and 29.4 g. (0.1 mol) of cis-3,6-endomethylene-Δ⁴-tetrahydrophthalic acid dibutyl ester are mixed together whereby the temperature rises to about 60° C. and sinks slowly afterwards. After heating for 5 hours at 65° C., the reaction product is dissolved in 200 cc. of benzene and 50 cc. of petroleum ether. Then the mass is shaken out twice with 100 cc. of a 10% soda solution and five times with 150 cc. of water. After distilling off the solvent, 41.5 g. (77.5% of the theory) of the new ester are obtained.

The reaction is considered to take place in conformity with the following schematic representation.

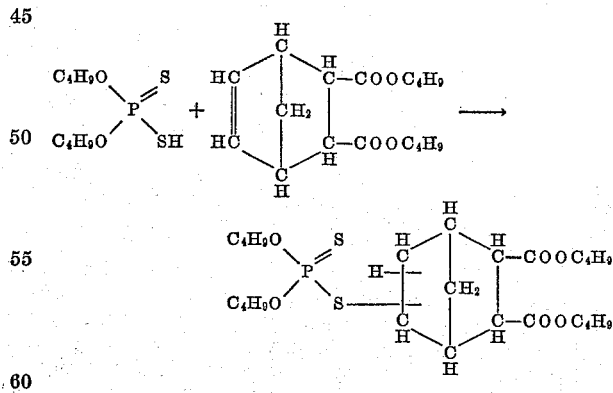

Lubricating oils having this ester as addition show increased properties in comparing them with the same oils without the ester.

Example 7

During a period of 5 minutes, a mixture is formed of 18.9 g. (0.12 mol) of dithiophosphoric acid-O,O-dimethyl ester, 0.1 g. of hydroquinone, and 20.8 g. of 2,5-endomethylene-1-methyl-Δ³-tetrahydrobenzoic acid butyl ester whereby the temperature rises to 48° C. After heating for 6 hours at 65° C. the resulting reaction mass is dissolved in 200 cc. of benzene, shaken out twice with 100 cc. of a 10% soda solution and eight times with 100 cc. of water. After drying and expelling the solvent, 30 g. (82% of the theory) of the new ester are obtained.

The reaction is considered to take place in conformity with the following schematic representation.

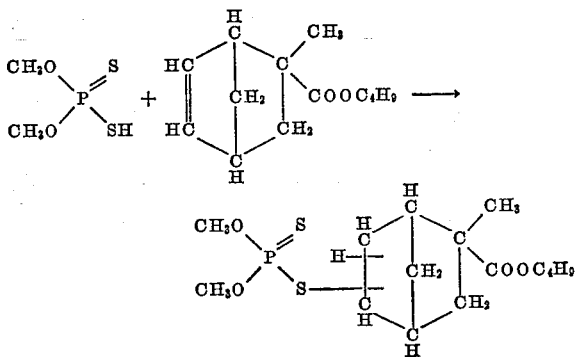

Example 8

In the course of about 10 minutes, at room temperature, 18.96 g. (0.12 mol) of dithiophosphoric acid-O,O-dimethyl ester and 29.2 g. (0.1 mol) of 2,5-endomethylene-1-methyl-Δ³-tetrahydrobenzoic acid decyl ester are stirred together. After standing overnight and heating for 16 hours at 50° C., the mixture is taken up in 150 cc. of butanol, washed once with 50 cc. of a 10% bicarbonate solution and twice with 100 cc. of water. After drying and vaporizing off the solvent there remains 23.5 g. (52.2% of the theory) of a yellow oil of low viscosity.

The reaction is considered to take place in conformity with the following schematic representation.

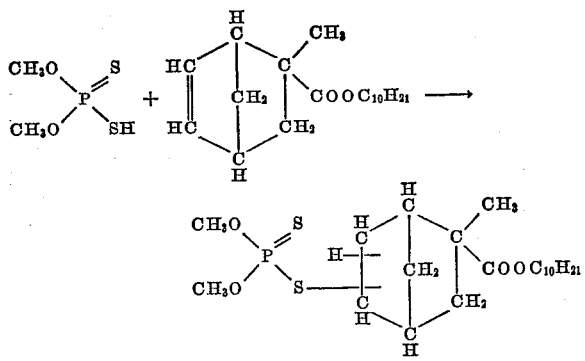

Example 9

Within 5 minutes and under stirring 37.8 g. (0.24 mol) of dithiophosphoric acid-O,O-dimethyl ester containing 0.2 g. hydroquinone are mixed with 36 g. (0.2 mol) of 2,5-endomethylene-6-methyl - Δ³ - tetrahydrobenzoin acid ethyl ester whereby the temperature rises up to 52° C. After controlling the initial heat of reaction, one heats for another 6 hours to 65° C., absorbs the reaction mass of 200 cc. of benzene and shakes out twice with 100 cc. of a 10% soda solution and six times with 100 cc. of water. After drying and distilling off the solvents, 51 g. (75.9% of the theory) of the new ester are obtained.

The reaction is considered to take place in conformity with the following schematic representation.

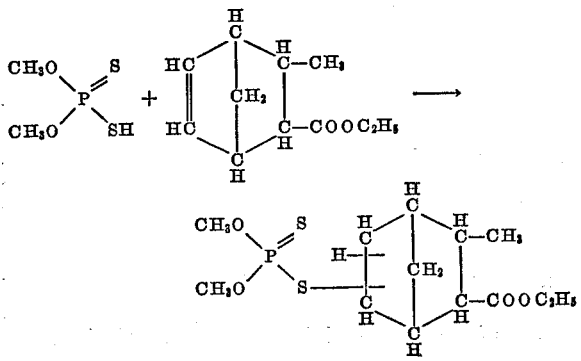

Example 10

Under steady stirring and over a period of 15 minutes a mixture is formed of 37.8 g. (0.24 mol) of dithiophosphoric acid-O,O-dimethyl ester, 0.2 g. of hydroquinone, and 23.8 g. (0.2 mol) 2,5-endomethylene-Δ³-tetrahydrobenzonitrile. The strongly exothermic reaction is kept under 60° C. by cooling. After termination of the evolution of heat, heating is continued for another 5 hours at 65° C. After absorbing the reaction mixture in 200 cc. of benzene and 50 cc. of petroleum ether, it is shaken out twice with each 100 cc. of a 10% soda solution and eight times with each 150 cc. of water. After drying and removal of the solvent, one obtains in this manner 50.8 g. (95% of the theory) of the new ester.

The reaction is considered to take place in conformity with the following schematic representation.

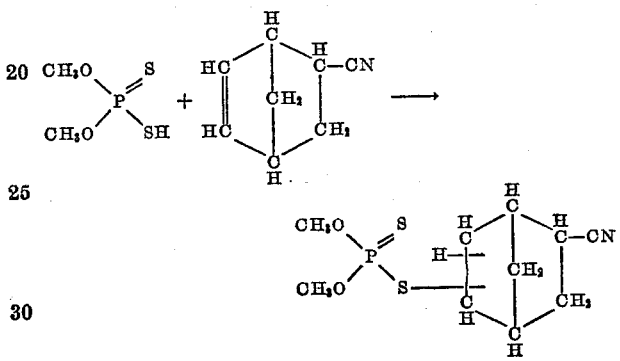

Example 11

Over a period of about 10 minutes 37.8 (0.24 mol) dithiophosphoric acid-O,O-dimethyl ester are stirred into 24.2 g. (0.2 mol) 2.5 endomethylene-Δ³-tetrahydrobenzaldehyde. The exothermic heat of reaction is controlled to a temperature of about 60° C. Then, the reaction mixture is taken up in 200 cc. of benzene and 100 cc. of petroleum ether, shaken out with 100 cc. of a 10% soda solution and eight times with 150 cc. of water. After drying and expelling the solvent, one obtains 46.8 g. (84% of the theory) as a yellow oil.

The reaction is considered to take place in conformity with the following schematic representation.

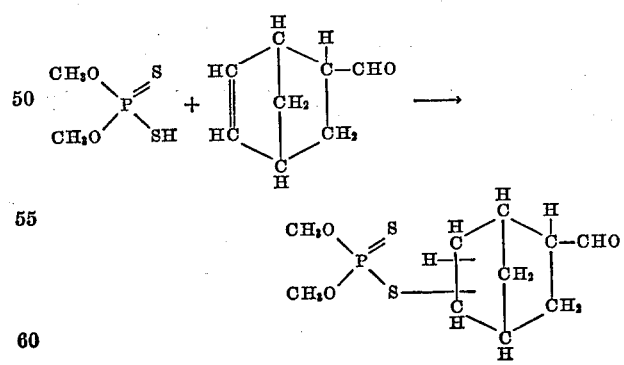

Example 12

Under strong stirring, 24.2 g. (0.2 mol) 2,5-endomethylene-Δ³-tetrahydrobenzaldehyde are dripped into 58.08 g. (0.24 mol) of dithiophosphoric acid-O,O-dibutyl ester whereby a strong heating occurs which is dissipated by cooling when a temperature of 60° C. is reached. After standing overnight, the reaction mass is taken up in 100 cc. of benzene and 50 cc. of petroleum ether, washed once with 100 cc. of a 10% soda solution and four times, each time, with 150 cc. of water. After drying the organic phase with sodium sulfate and removing the solvent, there remains 60.6 g. (83.3% of the theoretical yield) of a slightly yellow oil.

The reaction is considered to take place in conformity with the following schematic representation.

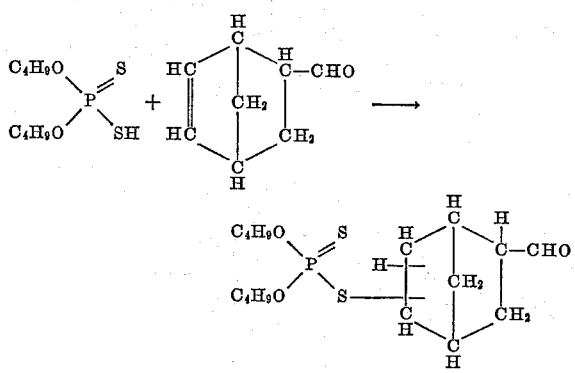

Example 13

In the course of 20 minutes, 28.4 g. (0.2 mol) of 2,5-endomethylene-$\Delta^3$-tetrahydrobenzyl alcohol are fed under stirring into 44.64 g. (0.24 mol) of dithiophosphoric acid-O,O-diethyl ester and the temperature is always kept under 30° C. After 1 hour, the reaction mass is dissolved in 150 cc. of benzene, shaken out once with 50 cc. of a 10% sodium bicarbonate solution and twice with 100 cc. of water. After drying and expelling the benzene, there remains 49 g. (79% of the theory) of the new ester as a yellow oil.

The reaction is considered to take place in conformity with the following schematic representation.

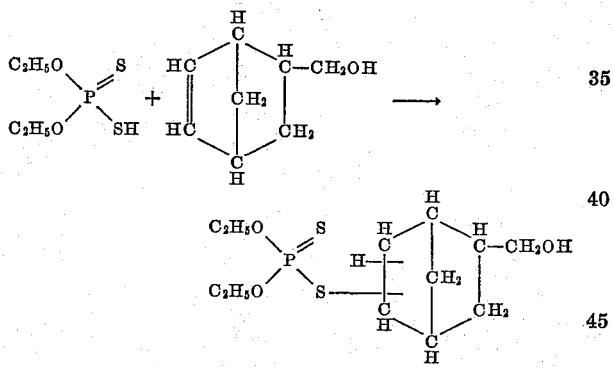

Example 14

During a period of about 20 minutes, 19.0 g. (0.1 mol) of the adduct of 2 mols of cyclopentadiene and 1 mol of allyl alcohol are fed into 18.96 g. of dithiophosphoric acid-O,O-dimethyl ester and the temperature kept at 30° C. After standing overnight, the mixture is taken up in 150 cc. of benzene, shaken out once with 50 cc. of a 10% sodium carbonate solution and twice with 100 cc. of water. Drying and removal of the solvent provides 20 g. (57.5% of the theory) of the new ester.

The reaction is considered to take place in conformity with the following schematic representation.

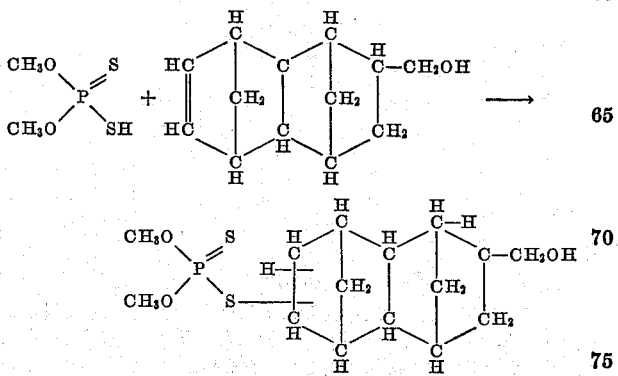

Example 15

Under stirring and during the course of 20 minutes 28.5 g. (0.2 mol) of 2,5-endomethylene-$\Delta^3$-tetrahydrobenzyl chloride are fed into 37.92 g. (0.25 mol) of dithiophosphoric acid-O,O-dimethyl ester and the mixture which is strongly exothermic is kept under 60° C. by cooling. Then the mixture is stirred for another 2 hours at 60–65° C., and taken up in 150 cc. of benzene; the mixture is shaken out once with 50 cc. of a 10% sodium bicarbonate solution and twice with 100 cc. of water. After drying and expelling the solvent, there remains as a reaction product 47 g. (78.1% of the theory) of a yellow oil.

The reaction is considered to take place in conformity with the following schematic representation.

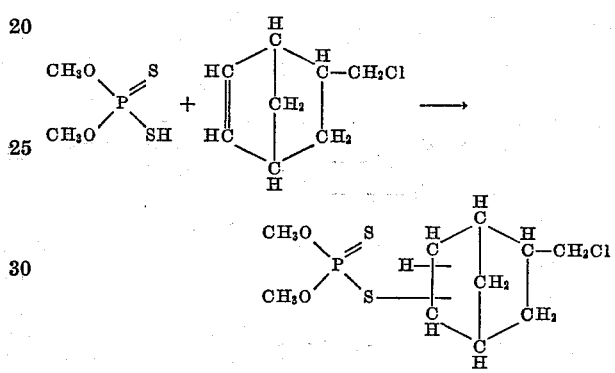

Example 16

In 15 minutes under stirring, 30.4 g. (0.2 mol) of 2,5-endomethylene-$\Delta^3$-tetrahydrophenyl acetate are fed into 37.92 g. (0.24 mol) of dithiophosphoric acid-O,O-dimethyl ester and the temperature is kept under 40° C. After stirring the mixture for 2 hours at room temperature, it is heated for another half hour at 50–60° C. Then it is dissolved in 150 cc. of benzene, shaken out once with 50 cc. of a 10% sodium bicarbonate solution and twice with 100 cc. of water. After drying and removing unreacted substances, 41 g. (66.2% of theory) of a yellow oil is obtained as a reaction product.

The reaction is considered to take place in conformity with the following schematic representation.

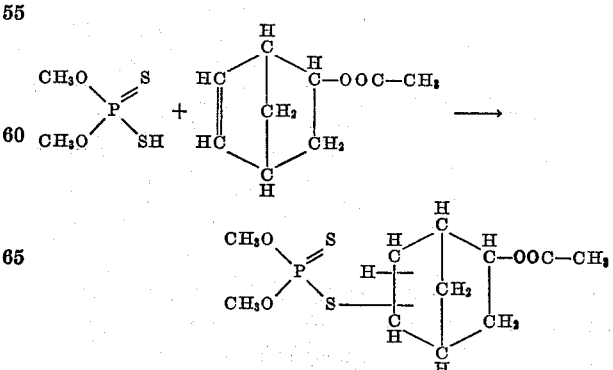

Example 17

During 15 minutes and under stirring, 21.8 g. (0.1 mol)

of the adduct from 2 mols of cyclopentadiene and 1 mol of vinyl acetate are fed into 29.04 g. (0.12 mol) of dithiophosphoric acid-O, O-dibutyl ester and the reaction temperature controlled to 40° C. After standing for one day, the reaction mixture is taken up in 150 cc. of benzene, washed out with 50 cc. of a 10% sodium bicarbonate solution and twice with 100 cc. of water. After drying and expelling the solvent, one obtains 37.0 g. (80.5% of the theory) of the new ester.

The reaction is considered to take place in conformity with the following schematic representation.

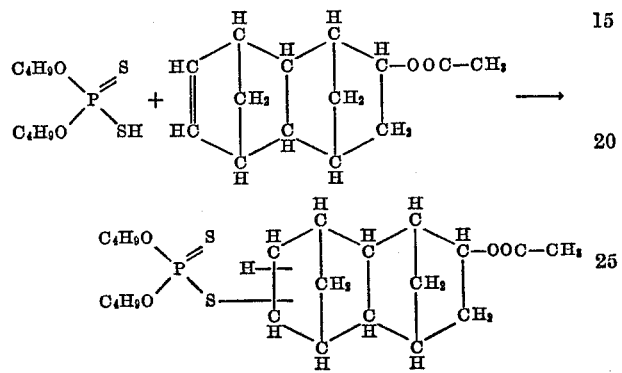

Example 18

A mixture is formed of 25.65 g. (0.1 mol) of the cyclopentadiene adduct of 1-trichlormethyl-2-nitro-ethylene and 18.96 (0.12 mol) of dithiophosphoric acid-O,O-dimethyl ester. A slight rise in temperature takes place as well as an increase in the viscosity and turbidity of the mixture but, after standing for one day, the reaction mixture crystallizes completely. After washing with methanol, one obtains 33 g. (79.7% of the theory) of pure white crystals with a melting point of 70–73° C.

The reaction is considered to take place in conformity with the following schematic representation.

The newly formed ester is especially useful as insecticide against house-flies and corn weevils.

Example 19

After mixing together 17.4 g. (0.1 mol) of cis-5,8-endomethylene Δ⁶-tetrahydro-naphthoquinone-1,4 and 18.9 g. (0.12 mol) of dithiophosphoric acid-O,O-dimethyl ester, the temperature rises to 60° C. but sinks immediately thereafter. The obtained viscous oil is stirred for another 6 hours at 50° C. whereby the viscosity increases further. After being taken up in 200 cc. of benzene, shaken out once with a 10% soda solution and washed four times with 200 cc. of water, there remains 22 g. (66.3% of the theory) of the new product.

The reaction is considered to take place in conformity with the following schematic representation.

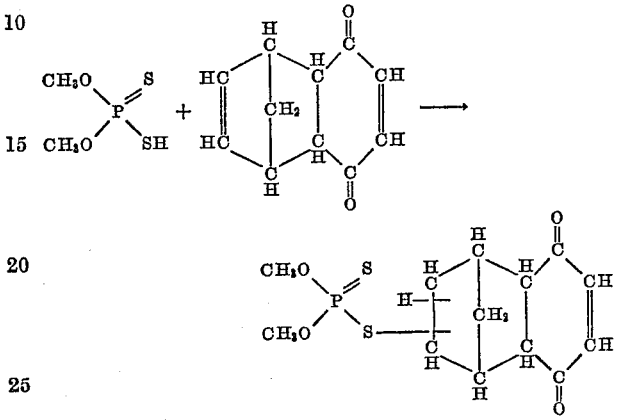

The reaction product possesses very good fungicidal properties.

Example 20

A mixture of 24 g. (0.1 mol) of the bis-cyclopentadiene adduct of p-benzoquinone in 400 cc. dioxane with 37.93 g. (0.24 mol) dithiophosphoric acid-O,O-dimethyl ester is formed. After the initial exothermic reaction has run its course, and after standing overnight, the reaction mixture is heated for an additional 6 hours at 60° C. After evaporation, there remains a viscous yellow oil which is dissolved in 150 cc. of benzene and shaken out five times with 50 cc. of a 10% sodium bicarbonate solution and five times with 100 cc. of water. After drying and evaporation of the solvent, there are present 30 g. of the new ester.

The reaction is considered to take place in conformity with the following schematic representation.

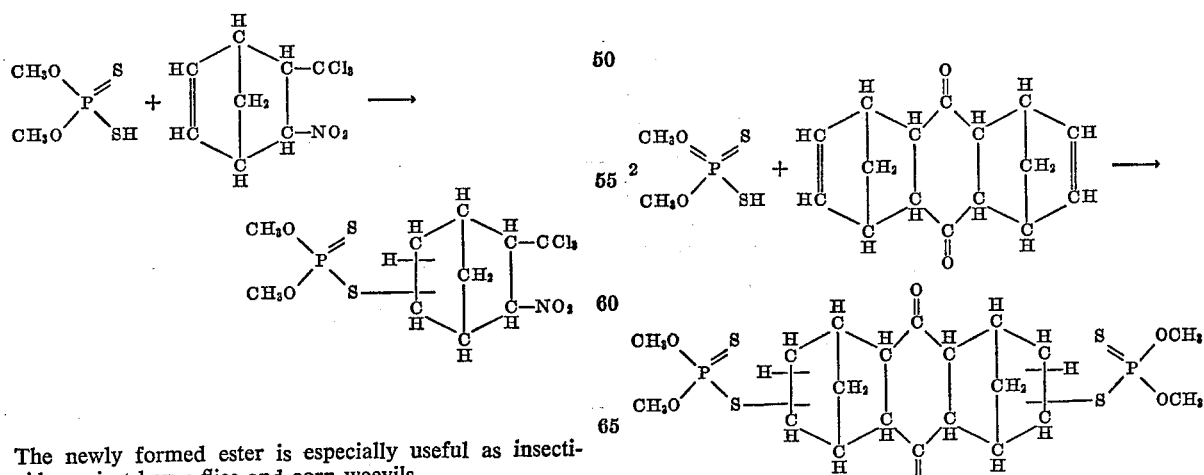

Example 21

Ten (10) g. of the adduct of cyclopentadiene and azodicarboxylic acid-diethyl ester with 7 g. of dithiophosphoric acid-O,O-dimethyl ester are diluted slowly in 50 cc. benzene and the temperature is kept under 30° C. After one day, the reaction mass is washed with a 10% sodium bicarbonate solution and several times with water. Drying and expelling the solvent give 15 g. of the new ester as a reddish highly viscous oil.

The reaction is considered to take place in conformity with the following schematic representation.

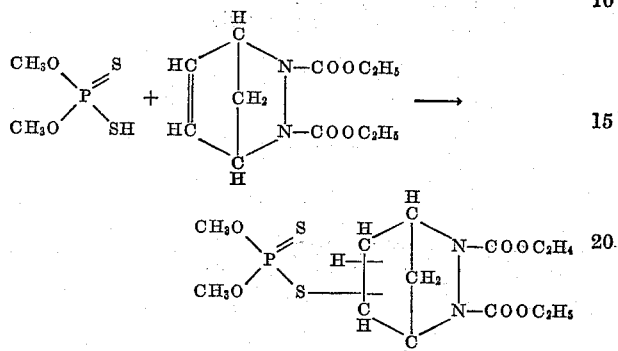

*Example 22*

Under stirring, 13.22 g. (0.2 mol) of dicyclopentadiene are added to 37.7 g. (0.2 mol) dithiophosphoric acid-O,O-dimethyl ester, during a period of 15 minutes and the strongly exothermic reaction is always held under 50° C. After heating for 30 hours at 65°, the mixture is then taken up in 200 cc. of benzene shaken out three times with 100 cc. of a 10% soda solution and eight times with 150 cc. of water. After removal of the solvent, there remains 30.3 g. (52.2% of the theory) of the reaction product.

The reaction is considered to take place in conformity with the following schematic representation.

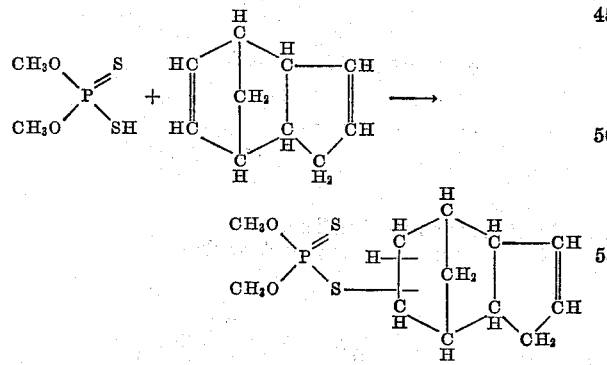

*Example 23*

Eleven and three tenths (11.3) grams of dithiophosphoric acid-O,O-dimethyl ester are added, under stirring, to a suspension of 26.1 g. of 1,2,3,4,10,10-hexachlor-1,4,4α,5,8,8α-hexahydro-1,4-endo-exo-5,8 - dimethylnaphthalene in 35 cc. benzene, whereupon the temperature rises only slightly. After heating for 4 hours to 65° C., the reaction product is taken up in 150 cc. benzene and 5 cc. of petroleum ether and shaken out twice, each time, with 100 cc. of 10% soda solution and five times, each time, with 150 cc. of water. After drying of the organic phase with sodium sulfate and removal of the solvent there remained 27.3 g. (73% of the theoretical yield) of white crystals with a melting point of 108–109° C.

The reaction is considered to take place in conformity with the following schematic representation.

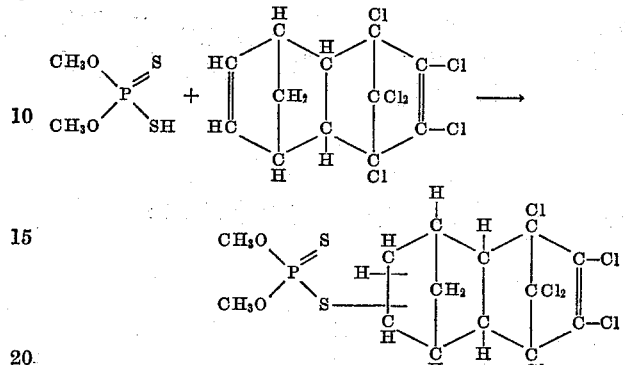

The newly formed compound is especially useful as insecticide against corn weevils and soil insect pests.

*Example 24*

A solution of 26.1 g. (0.0715 mol) of 1,2,3,4,10,10-hexachlor-1,4α,5,8α-hexahydro-1,4-endo-exo-5,8 - dimethylnaphthalene in 75 cc. of benzene is mixed with 18.15 g. (0.075 mol) of dithiophosphoric acid-O,O-dibutyl ester. After heating the mixture for five hours at 65° C. and permitting it to stand for several days, it is taken up in 150 cc. of benzene, washed with 100 cc. of a 10% soda solution and four times with 200 cc. of water. After drying and evaporation of the solvent, there remains 24.9 g. (41% of the theory) of a reaction product in the form of a yellow brown oil.

The reaction is considered to take place in conformity with the following schematic representation.

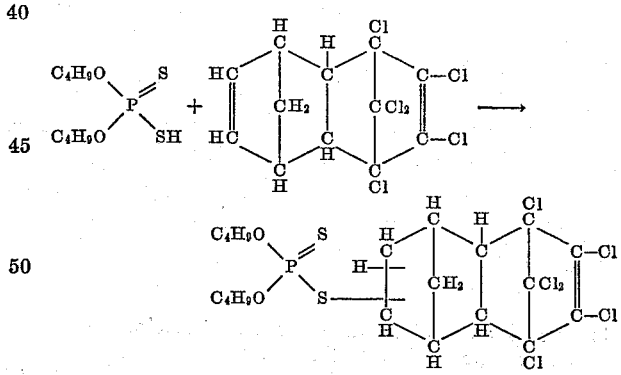

It will be understood that the embodiments of our invention described and illustrated herein are only representative of the principles of our invention and the agents and reactants used therein. Various modifications in the details of illustrative embodiments of our invention and additional embodiments can be visualized without departing from the spirit of the invention, or its scope, which is defined in the appended claims.

We claim:

1. A compound selected from the group of compounds having the general formula:

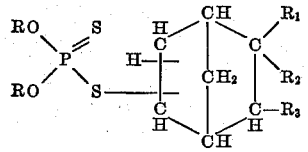

wherein R is an alkyl radical, $R_1$ is selected from the group consisting of H and a lower alkyl radical, $R_2$ individually is a radical selected from the group of radicals consisting of

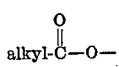

lower alkyl, lower alkanol, halogenated lower alkyl, formal and cyano radicals, $R_3$ individually is selected from the group consisting of H and a radical selected from the group consisting of

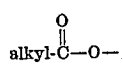

and nitro radicals and $R_2$ and $R_3$ jointly with the

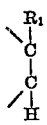

to which they are joined form part of a condensed ring selected from the group consisting of

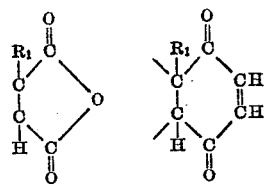

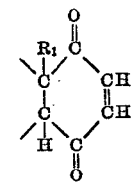

and

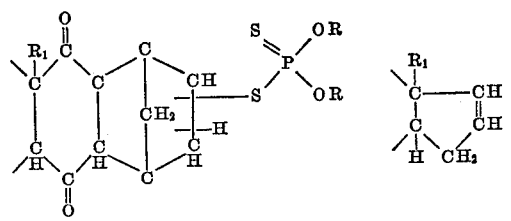

in which R and $R_1$ have the values stated herein.

2. A compound having the formula

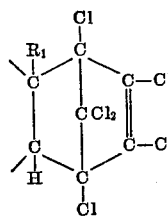

wherein R is an alkyl radical.

3. A compound having the formula

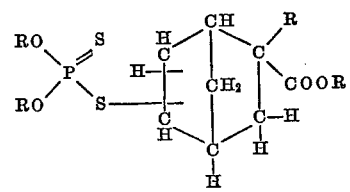

wherein R is an alkyl radical.

4. A compound having the formula

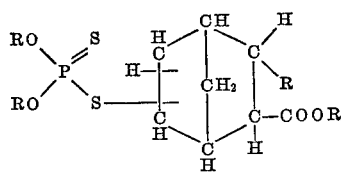

wherein R is an alkyl radical.

5. A compound having the formula

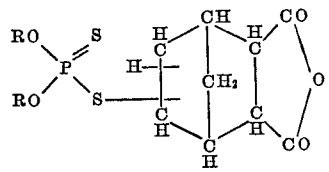

wherein R is an alkyl radical.

6. A compound having the formula

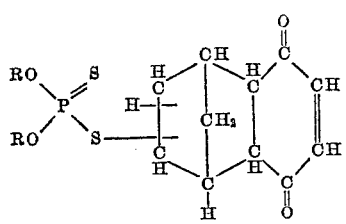

wherein R is an alkyl radical.

7. A compound having the formula

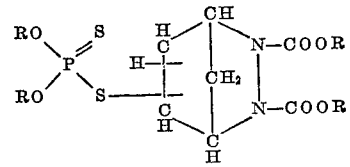

wherein R is an alkyl radical.

8. A compound having the formula

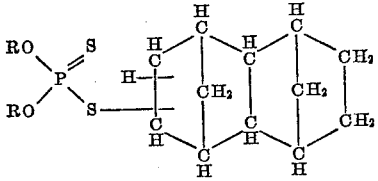

wherein R is an alkyl radical.

9. A compound having the formula

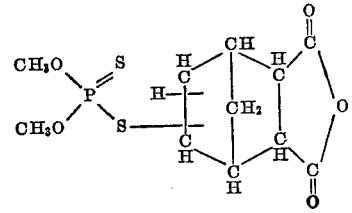

10. A compound having the formula

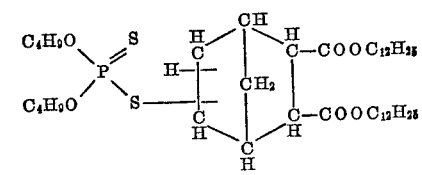

11. A compound having the formula

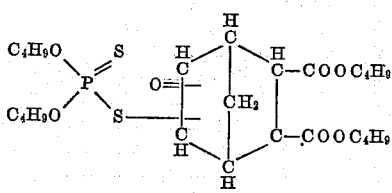

12. A compound having the formula

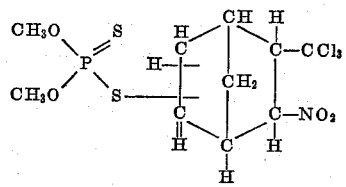

13. A compound having the formula

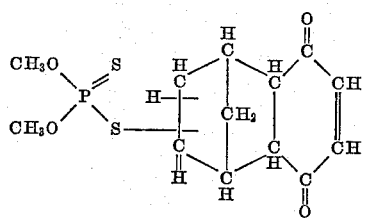

14. A compound having the formula

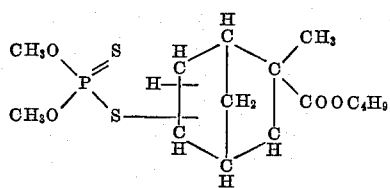

15. A compound having the formula

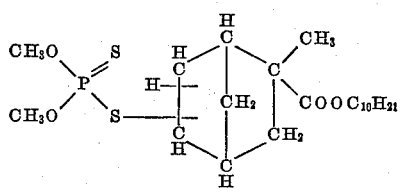

16. A compound having the formula

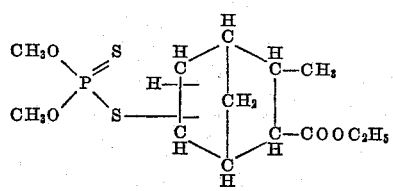

17. A compound having the formula

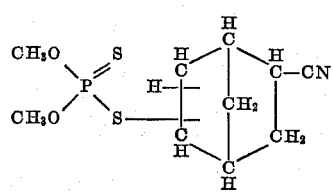

18. A compound having the formula

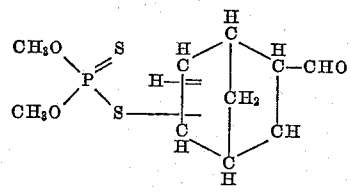

19. A compound having the formula

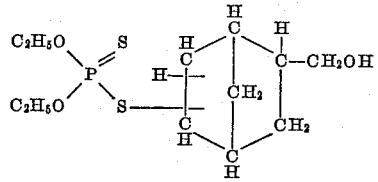

20. A compound having the formula

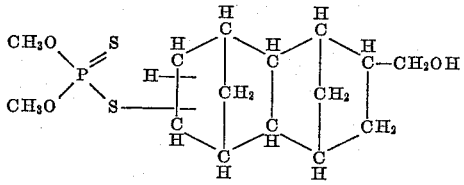

21. A compound having the formula

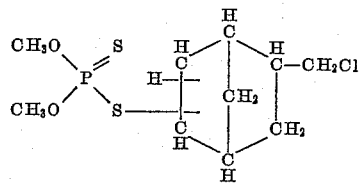

22. A compound having the formula

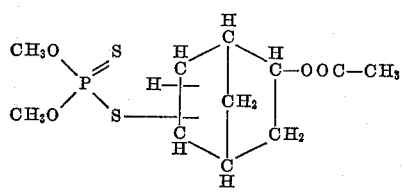

23. A compound having the formula

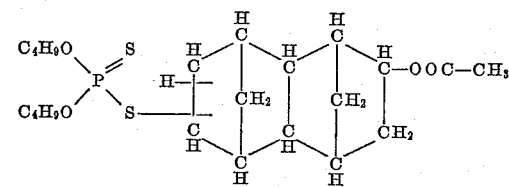

24. A compound 2,3-naphtha-5,8-endomethylene-1,3-hexahydrodiene-1,4 having the formula

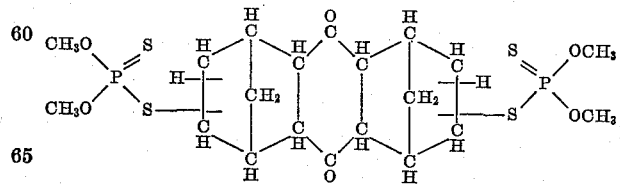

25. A compound having the formula

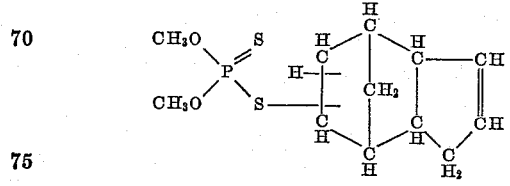

26. A compound having the formula
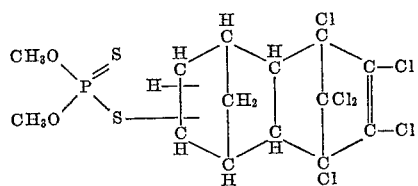
References Cited in the file of this patent
UNITED STATES PATENTS
| | | |
|---|---|---|
| 2,665,295 | Augustine | Jan. 5, 1954 |
| 2,680,132 | Schrader | June 1, 1954 |
| 2,689,258 | McDermott | Sept. 14, 1954 |
| 2,759,937 | Du Breuil | Aug. 21, 1956 |
| 2,759,938 | Du Breuil | Aug. 21, 1956 |
| 2,767,206 | Whetstone | Oct. 16, 1956 |
| 2,843,605 | Smith | July 15, 1958 |
| 2,888,465 | Hodes | May 26, 1959 |

UNITED STATES PATENT OFFICE
CERTIFICATE OF CORRECTION

Patent No. 3,023,209            February 27, 1962

Johannes Reese et al.

It is hereby certified that error appears in the above numbered patent requiring correction and that the said Letters Patent should read as corrected below.

Column 3, lines 31 to 38, the formula should appear as shown below instead of as in the patent:

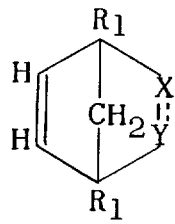

same column 3, lines 52 to 59, in the formulas, the "H's" in the entire formula should be outside the rings; column 9, lines 69 to 75, the formula should appear as shown below instead of as in the patent:

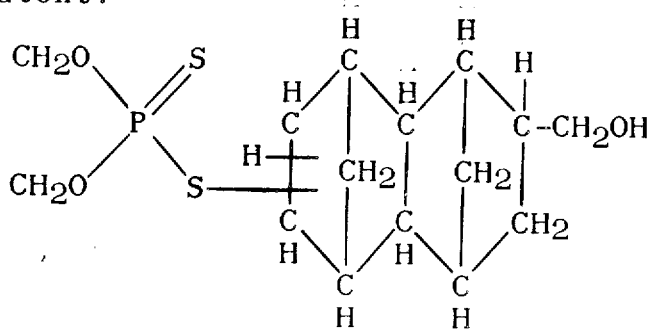

column 15, lines 24 to 31, the left-hand formula should appear as shown below instead of as in the patent:

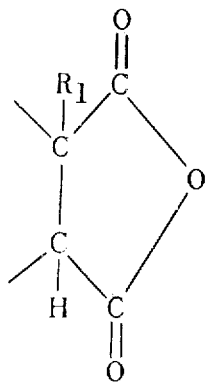

same column 15, lines 24 to 40, after each formula insert a comma; lines 44 to 51, between the two formulas insert -- and --; column 17, lines 2 to 10, the formula should appear as shown below instead of as in the patent.

3,023,209

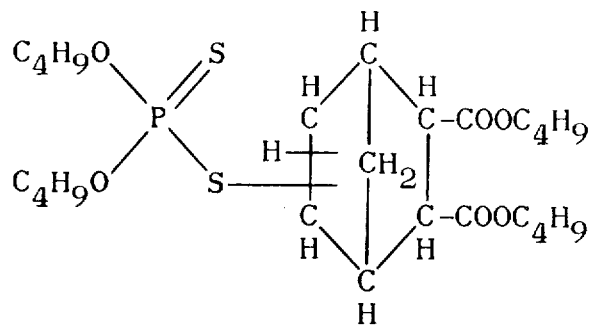

lines 35 to 44, the formula should appear as shown below instead of as in the patent:

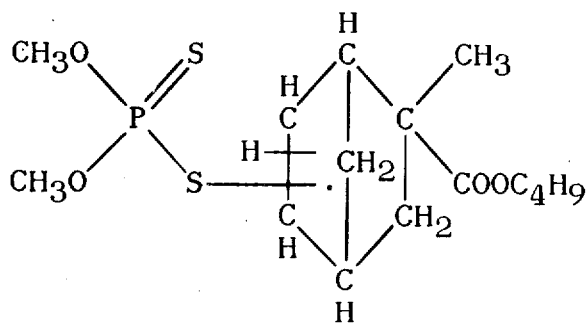

column 18, lines 2 to 9, the formula should appear as shown below instead of as in the patent:

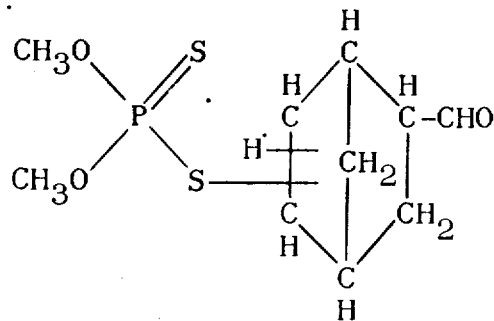

Signed and sealed this 11th day of September 1962.

(SEAL)
Attest:

ERNEST W. SWIDER
Attesting Officer

DAVID L. LADD
Commissioner of Patents